United States Patent [19]
Evans et al.

[11] Patent Number: 6,155,921
[45] Date of Patent: Dec. 5, 2000

[54] AIR RAMP

[75] Inventors: Susan Evans, Rohnert Park; Stephen Greer, Santa Rosa, both of Calif.; Rodney Marcantel, Coppell, Tex.; Alan Wardlow, Petaluma, Calif.

[73] Assignee: Alcatel USA Sourcing L.P., Plano, Tex.

[21] Appl. No.: 09/433,334

[22] Filed: Nov. 4, 1999

[51] Int. Cl.[7] .................................................. H05K 7/20
[52] U.S. Cl. .......................... 454/184; 169/49; 454/369
[58] Field of Search ................................. 454/184, 257, 454/369; 361/695, 678; 174/16.1; 169/44, 56, 59

[56] References Cited

U.S. PATENT DOCUMENTS 4,711,307  12/1987  Rosen ........................................ 169/57

FOREIGN PATENT DOCUMENTS 2 262 541  6/1974  Germany ............................... 454/369

*Primary Examiner*—Harold Joyce
*Attorney, Agent, or Firm*—Timothy F. Loomis, Esq.

[57] ABSTRACT

An apparatus for extinguishing fires in enclosures having an air ramp with an automatic trap door. When the trap door is tripped, the air flow is reduced. Fires can be extinguished through the reduced air flow. The air ramp includes a center section having an upwardly ramped center area, a trap door which is moveably attached to the center area and a front section which is connected to the center section. The front section allows the air ramp to be mounted in an enclosure.

23 Claims, 19 Drawing Sheets

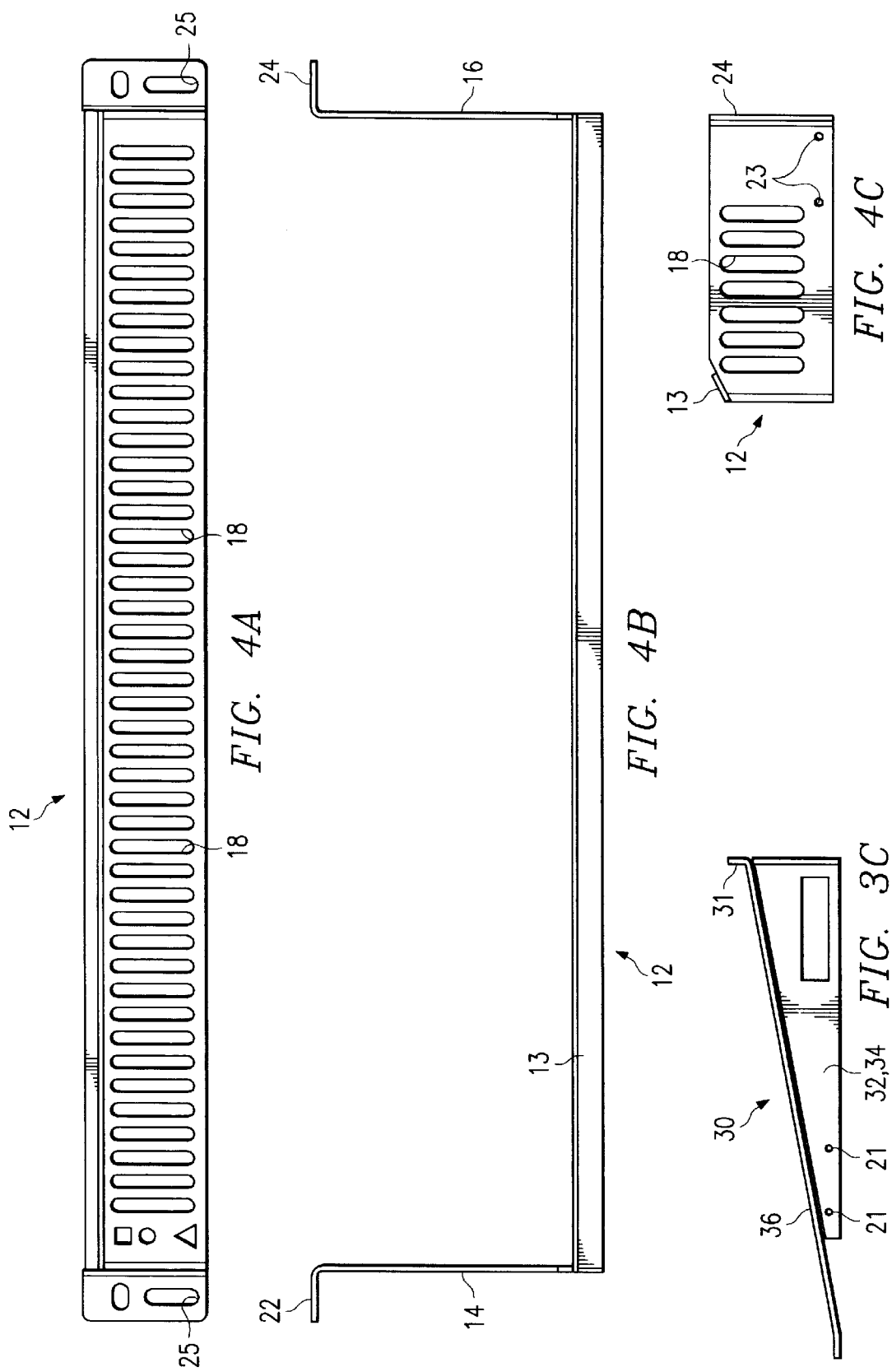

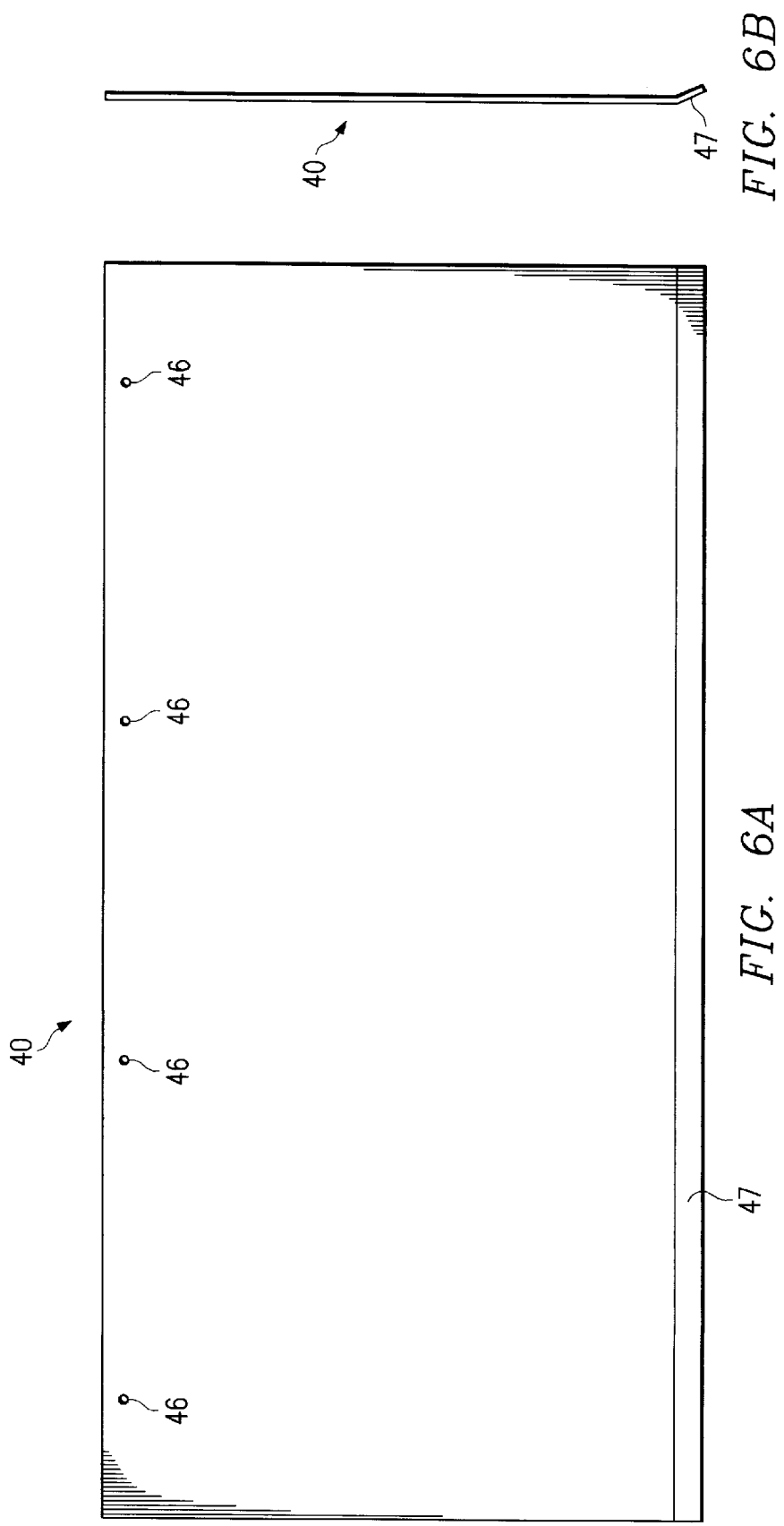

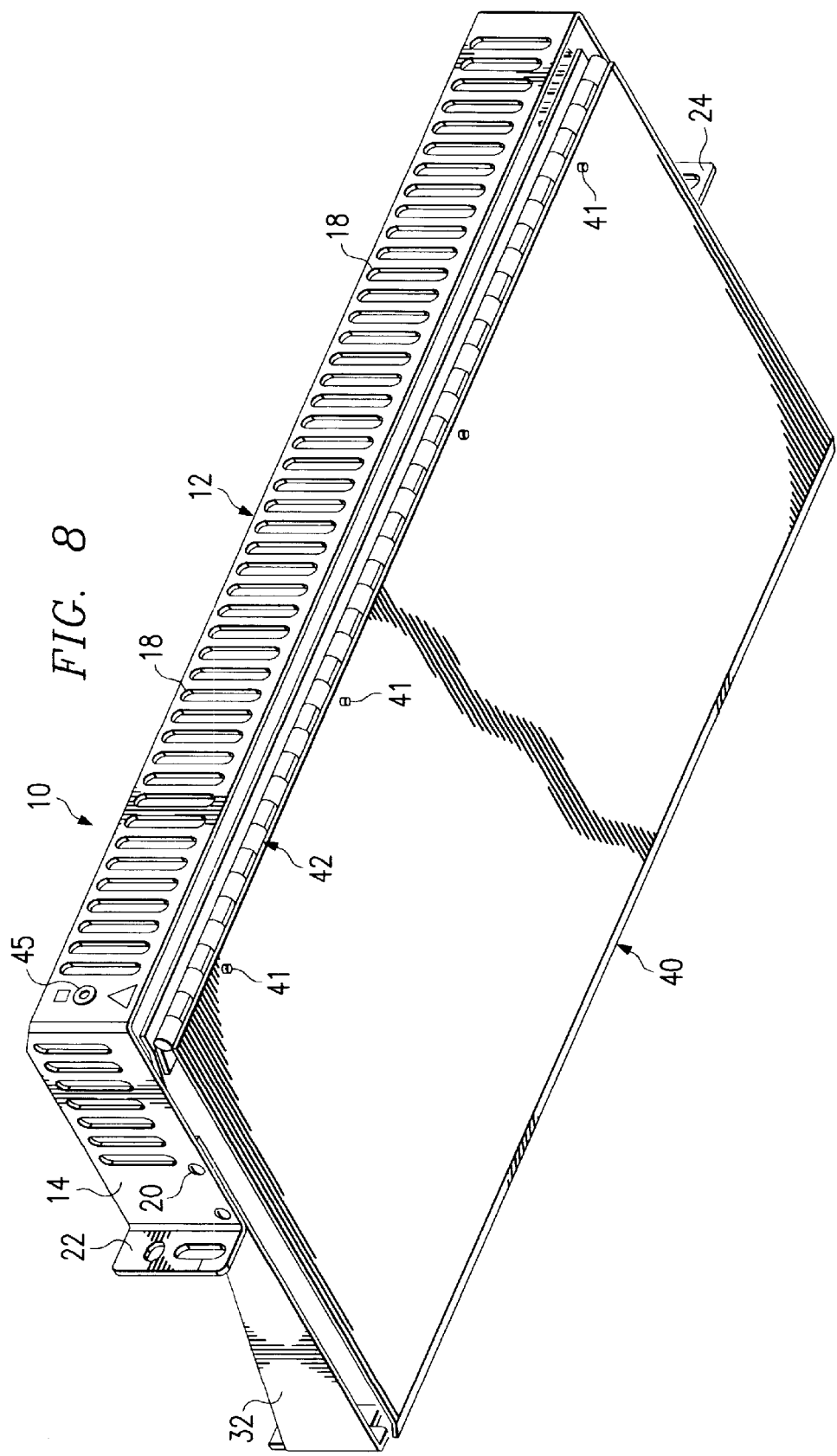

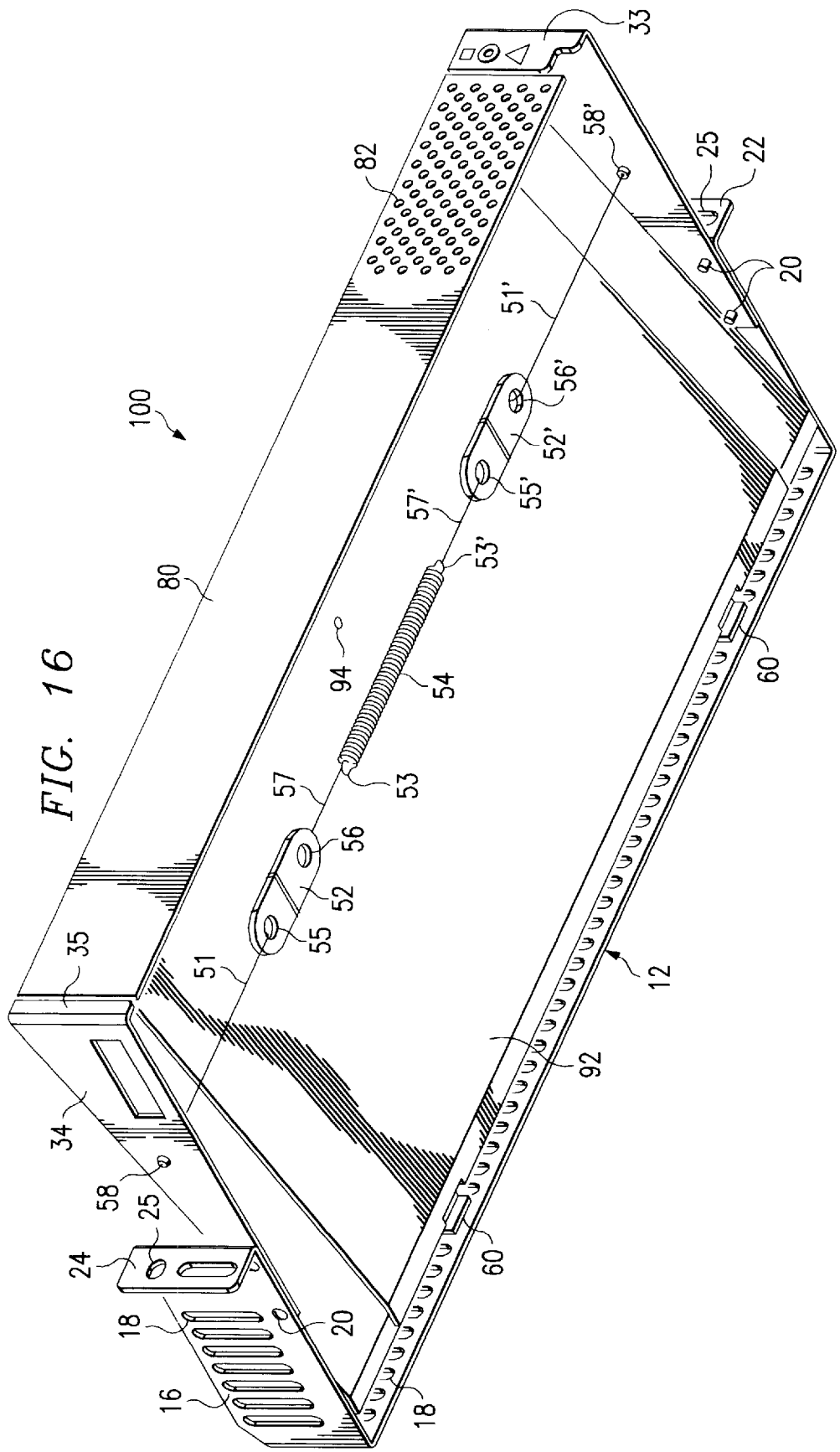

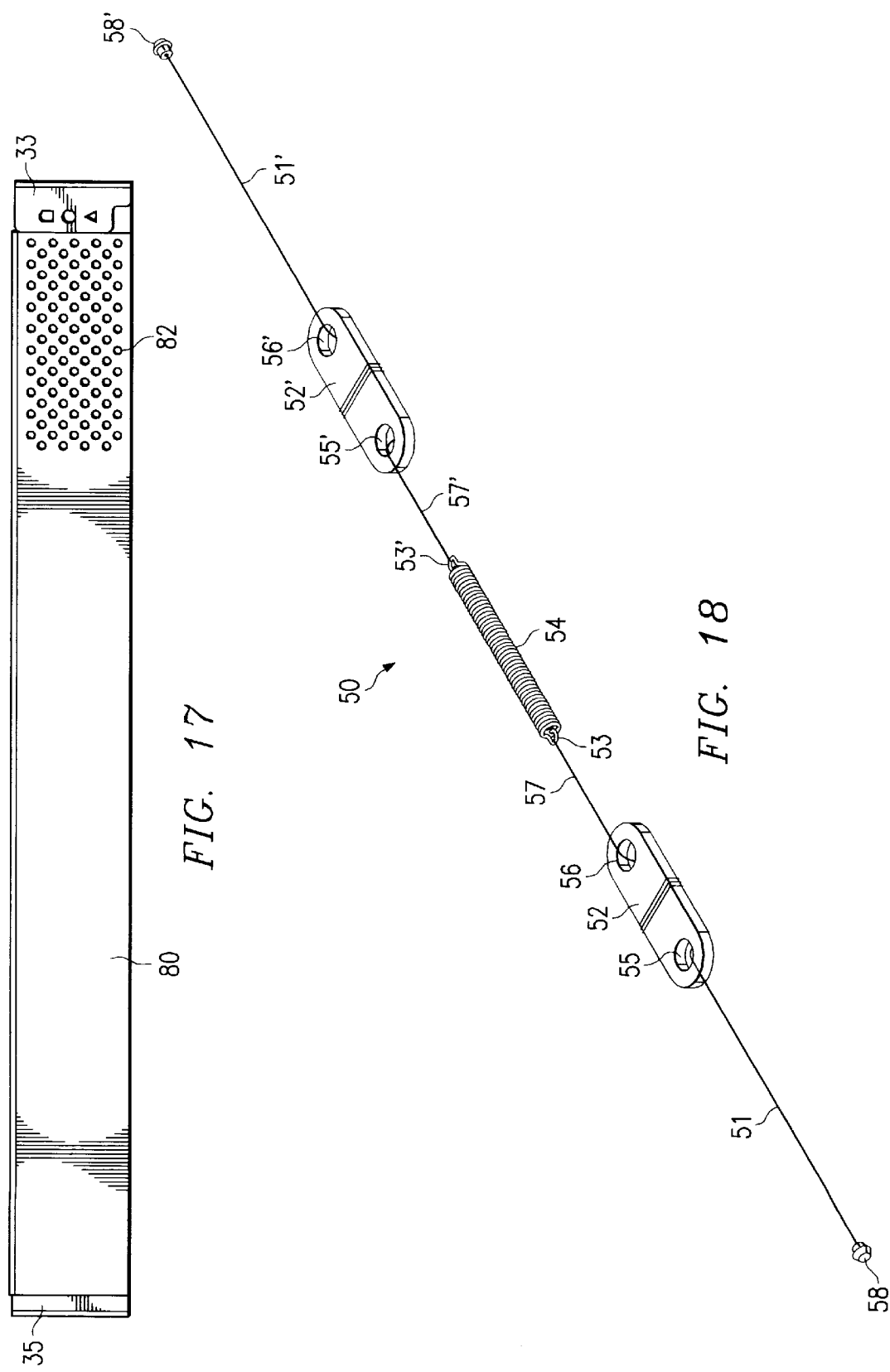

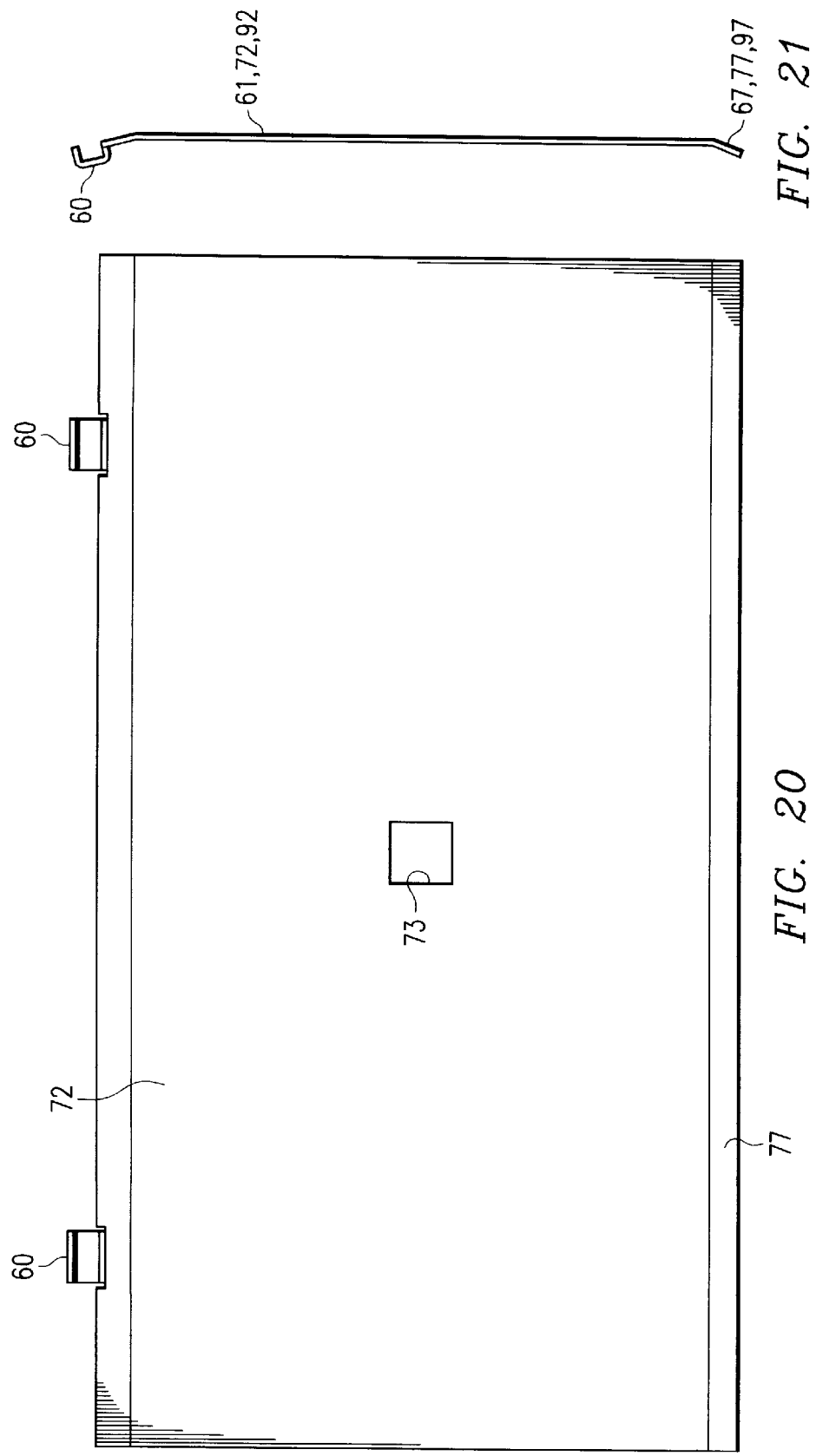

AIR RAMP

FIELD OF THE INVENTION

The present invention is directed to an apparatus for extinguishing fires in enclosures. In particular, an air ramp with an automatic trap door is provided to reduce the air flow. When the trap door is tripped, a reduced air flow causes a fire to be extinguished.

BACKGROUND OF THE INVENTION

In enclosures containing electrical equipment, such as circuit boards, switches and systems, an air flow is needed to help keep the operating temperatures at a desired level. One way of performing this function is to have a fan unit providing lower temperature fresh air to the components in the enclosure. The fresh air flow would be provided in a lower area and rises to the top due to the convection heating of the enclosure.

Current devices for removing the heated air from the enclosure include air exit openings at the upper ends of the enclosures. Additional devices for allowing air to exit the enclosures include air ramps. However, in the case of a fire, the existing air ramp provides no means of controlling the air flow to extinguish a fire in the enclosure.

SUMMARY OF THE INVENTION

Briefly, the invention comprises an air ramp for an enclosure. The air ramp includes a damper door to control the flow of air. Material, which melts at a temperature above 500 degrees F., is strung underneath the damper door holding the door against an upwardly ramped section of the air ramp. The door is sitting at a 30-degree angle from the horizontal. The material is attached to the sides of the air ramp chassis and is kept taut by a series of fusible links and tension spring to keep the door against the air ramp. Once the temperature reaches a trigger level, such as 360 degrees, the fuseable links would fail causing the door to drop and stop a majority of airflow from exiting the air ramp.

The invention approves upon the existing devices by providing the presence of the damper door. Once the damper door has been released the feature of suppressing a fire in an enclosure is achievable.

The invention further improves upon the existing devices by providing an automatic tripping device for releasing the damper door when a temperature threshold has been reached.

The invention further improves upon existing devices for enclosures by the use of a spring-loaded hinge to effect faster closing times of the trap door when the tripping devices have been activated.

Furthermore a manual tripping mechanism may be used in combination with the automatic tripping device. This would serve as a back-up for the primary tripping device.

The invention provides an effective fire extinguisher by using means to direct the flow of air in an enclosure for electronic equipment. The fire extinguisher includes a trap door that is movable between a first position and a second position. When the trap door is in the first position, the flow of air is uninhabited thereby allowing a flow-through air environment. When the trap door is in the second position, the flow of air is inhibited therefor stopping the flow air through the enclosure. Once the air flow has ceased any fire that occurred would be extinguished due to the lack of supply of air.

The invention further provides an effective air flow control device by using means to direct the flow of air and by using a damper door for controlling the amount of air flow through the device. The damper door is controlled by a tripping device that is heat responsive.

The invention still further provides an effective air flow control device by using means to direct the flow of air in an enclosure. The device further includes a trap door that is movable between a first position and a second position. When the trap door is in the first position, the flow of air is uninhabited thereby allowing a flow-through air environment. When the trap door is in the second position, the flow of air is inhibited therefor stopping the flow air through the enclosure.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIGS. 3A–3C show a center section for an air ramp apparatus in accordance with a first illustration of the present invention.

FIGS. 4A–4C show a front section for an air ramp apparatus in accordance with a first illustration of the present invention.

FIG. 6A–6B shows a damper/trap door for an air ramp apparatus in accordance with a first illustration of the present invention.

FIG. 8 shows an air ramp apparatus in accordance with a first illustration of the present invention having a tripped damper door.

FIG. 16 shows a reverse view of an air ramp apparatus in accordance with a fourth illustration of the present invention.

FIG. 17 shows the back plate of an air ramp apparatus in accordance with the present invention.

FIG. 18 shows a tripping device for an air ramp apparatus in accordance with the present invention.

FIG. 20 shows a third illustration of a damper door for an air ramp apparatus in accordance with the present invention.

FIG. 21 shows a profile view of the damper door used in the second and third illustrations.

DETAILED DESCRIPTION OF THE PREFERRED EMBODIMENTS

Figure 1:
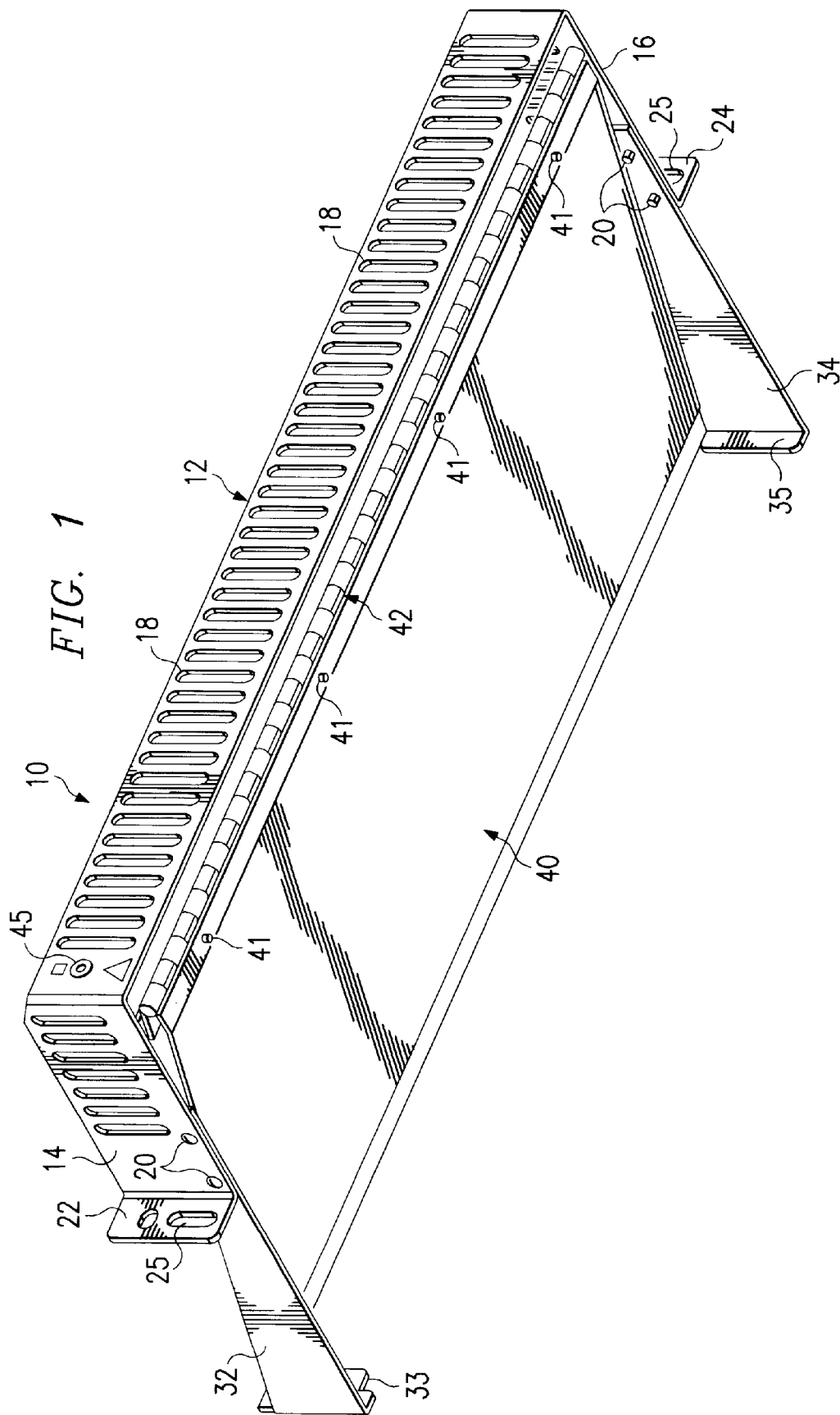
FIG. 1 shows an air ramp apparatus in accordance with a first illustration of the present invention.
Figure 2:
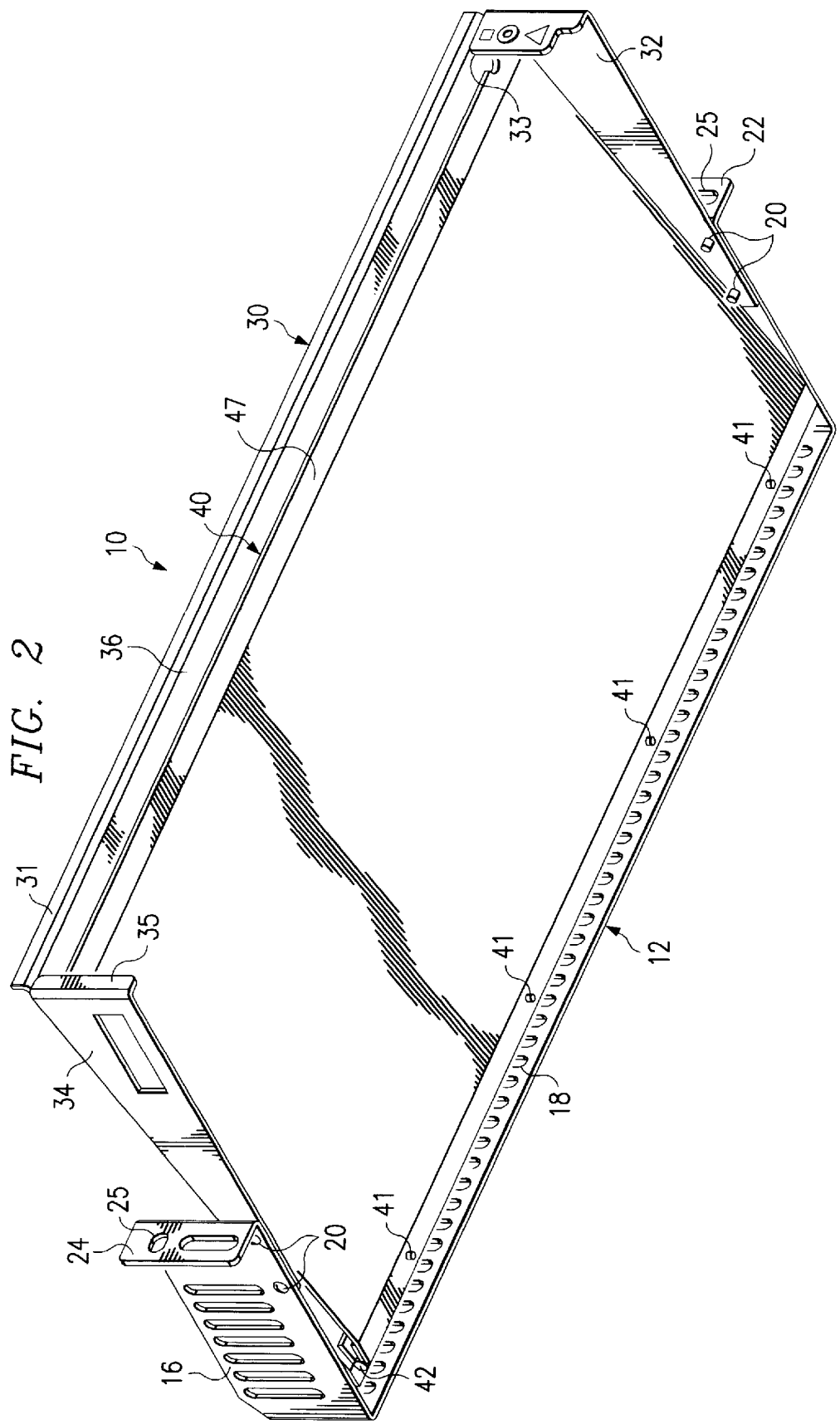
FIG. 2 shows a reverse view of an air ramp apparatus in accordance with a first illustration of the present invention.

FIGS. 1 and 2 disclose an air ramp 10 that serves two functions. A first function is to provide an enclosure housing electrical equipment with a means for heated air to exit the enclosure. A second function is to provide a fire extinguishing device to cut off the flow of air that feeds a fire within the enclosure. The air ramp comprises a front section 12 having a plurality of elongated slots 18. The front section 12 further includes side elements 14 and 16, each having sections 22 and 24, respectively. Sections 22 and 24 include a plurality of mounting holes to allow the air ramp to be mounted within an enclosure. The front section further includes additional elements 45 which are mounted into the front section 12. Connected to the front section 12, via a plurality of rivets 20 is an upwardly ramped center section 30. The center section 30 includes a ramp area 36 and two edges (32, 34) which are generally perpendicular to the center area 36. Further disclosed in FIGS. 1 and 2 is that the two edges (32, 34) each have an angled flange 33, 35 respectively.

A key element of the air ramp 10 is the inclusion of a trap door 40. The trap door is attached to the center section 30 via an elongated hinge 42 having a plurality of rivets 41 connections. When the trap door 40 is in its first position, it allows the flow of air to exit the air ramp 10. When the trap door 40 is in its second position, it substantially stops the flow of from exiting the air ramp 10. Accordingly extinguishing a fire within an enclosure.

Figure 3A:
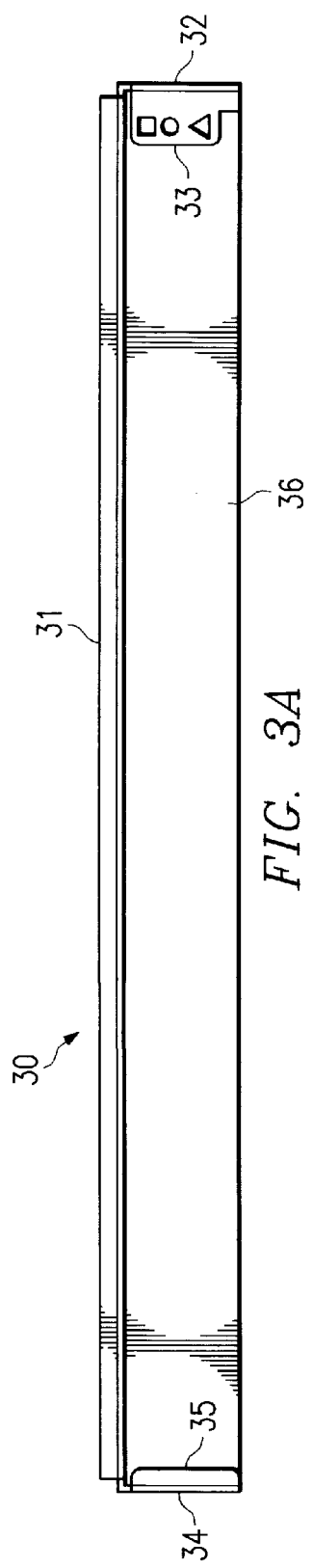
Figure 3B:
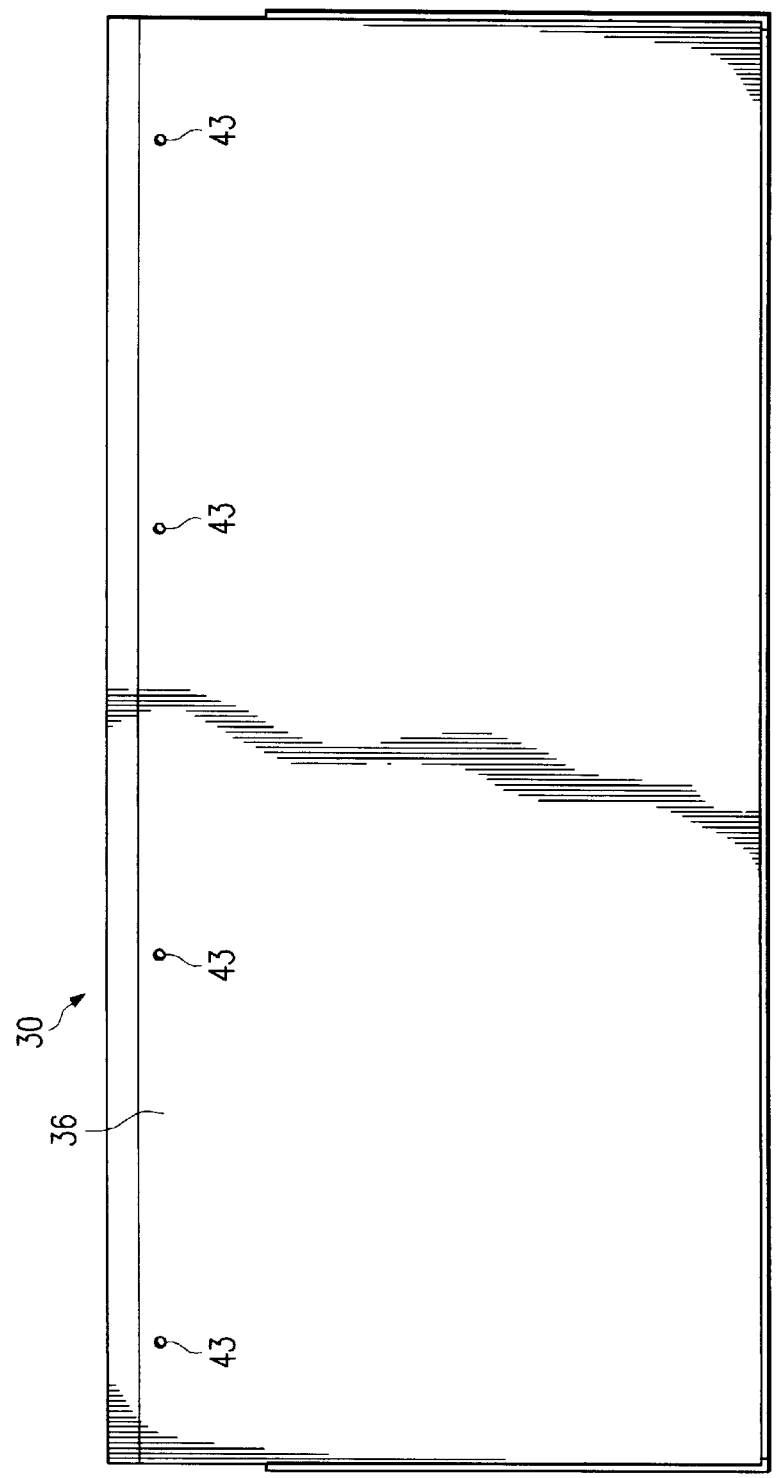

FIGS. 3A–3C disclose a more detailed view of the center section 30. Aside from the elements already described, the center area 36 includes a plurality of holes 43 into which the rivets 41 shown in FIGS. 1 and 2 will go. Holes 21 allow the center section 30 to be mounted to the front section 12 shown in FIGS. 1 and 2. As shown in FIG. 3C, a generally upward lip 31 extends off the upwardly ramped center area 36. When the air ramp is mounted within an enclosure, this lip 31 serves to provide a sealing function between the air ramp 10 and the enclosure.

FIGS. 4A–4C disclose a detailed view of the front section 12. It is shown that elements 14 and 16 are generally perpendicular to both a main section 13 and sections 22 and 24. As shown in FIG. 4C, a portion of the main section is angled and that a plurality of holes 23 are used for the rivets 20 shown in FIGS. 1 and 2.

Figure 5:
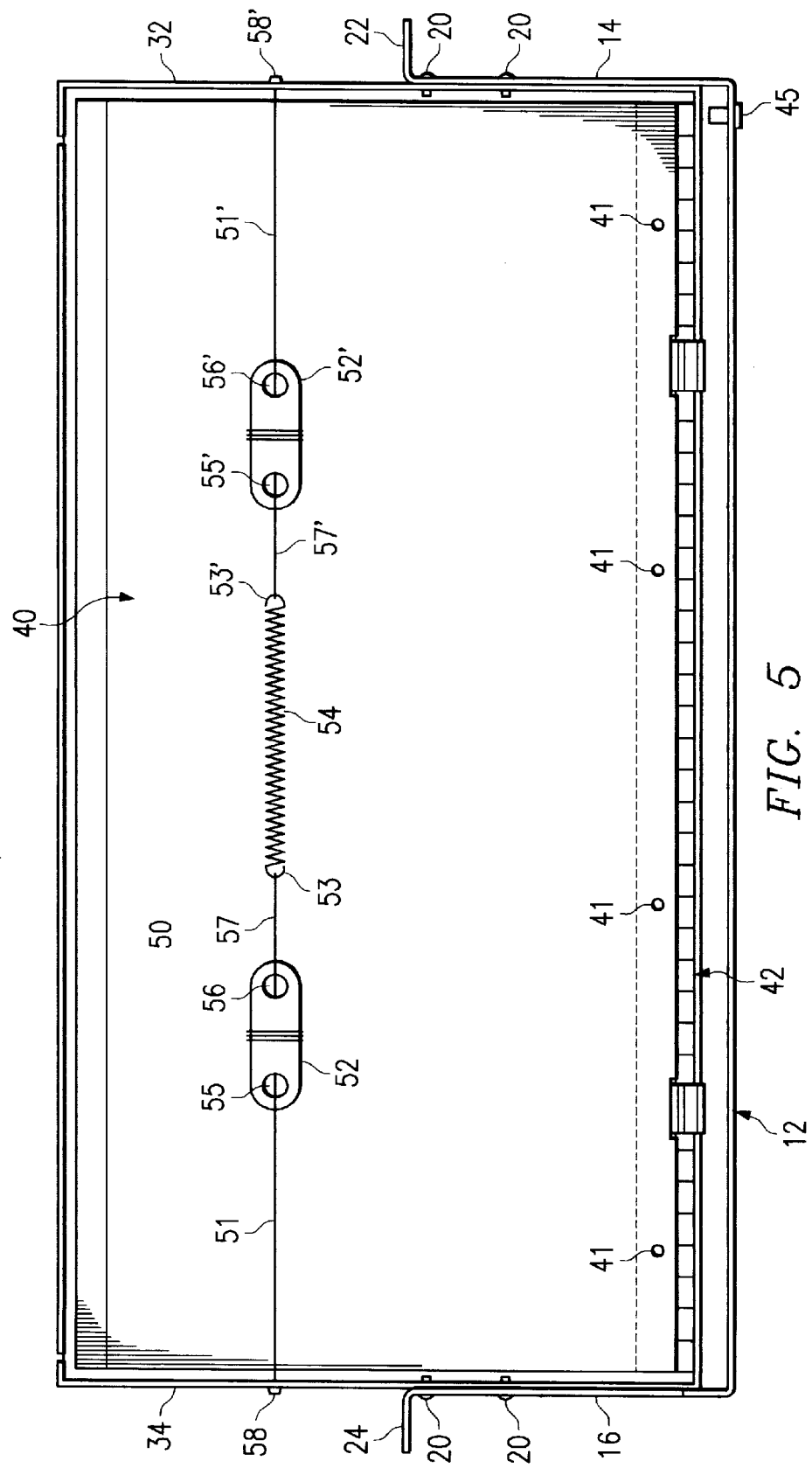
FIG. 5 shows an air ramp apparatus in accordance with a first illustration of the present invention.

FIG. 5 discloses the air ramp 10 with a tripping device 50 as shown in FIG. 18. The tripping device 50 keeps the ramp door in its first position before being tripped. The tripping device 50 includes fusible links 52 and 52'. The fusible links include a pair of openings (55, 56, 55' and 56'). These openings (55, 56, 55' and 56' are attached to wire elements (51, 57) and (57', 51'), respectively. A spring like element 54 having attachment elements 53 and 53' are connected to the wires 57 and 57'. The spring element 54 provides a preset tension, e.g. 3–6 lbs, in the linkage of the above elements between anchor points 58 and 58'. The fusible links (52, 52' are those described in U.S. Pat. No. 5,120,152, which is incorporated herein by reference. The fusible links can be designed to separate at preset temperature thresholds. When these thresholds are reached, the tripping device is activated and allows the door 40 to fall from its first position to its second position. The movement of the trap door can be aided by spring loading elongated hinge 42 so that it is biased to move the trap door 40 from its first position to its second position at a rate which is faster than the gravity free fall without such spring loading. Further shown in FIG. 5 is a bushing 45 which is placed in the front section 12.

FIGS. 6A and 6B show a trap door 40 as used with a first illustration of the present invention. The trap door 40 includes a plurality of holes 46 for receiving the rivets 41 as shown in FIGS. 1 and 2. Furthermore, the trap door is generally flat except for area 47. The area 47 is angled towards the upwardly ramped center area 36 shown in FIGS. 3A–C. The trap door 40 may be made from either metal, heat resistant plastic or tempered glass.

Figures 7A, 7B:
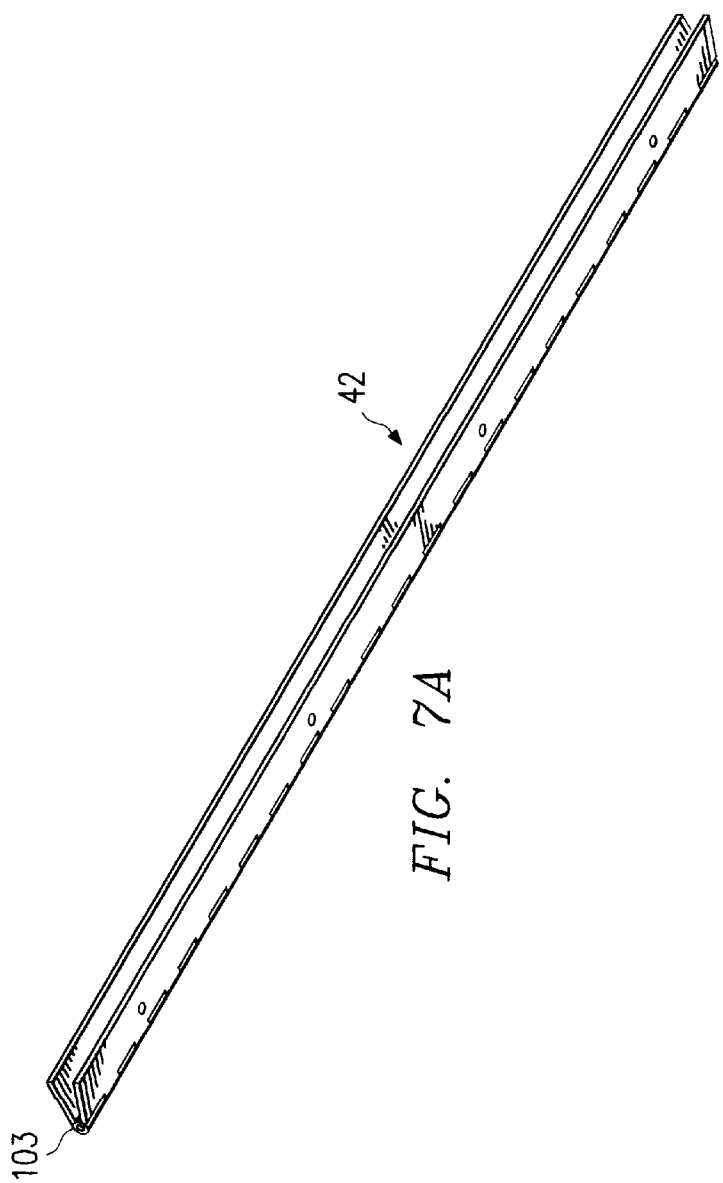
FIGS. 7A–7B show an elongated hinge for an air ramp apparatus in accordance with a first illustration of the present invention.

FIGS. 7A and 7B show an elongated hinge 42 as used with a first illustration of the present invention The elongated hinge 42 is made from elements 101 and 102 being connected together via pin 103. Elements 101 and 102 include a plurality of holes 48. These holes 48 line up with holes 46 of the trap door shown in FIG. 6A and holes 43 of the center section shown in FIG. 3B thereby connecting the trap door 40 to the center section 30.

Figure 9:
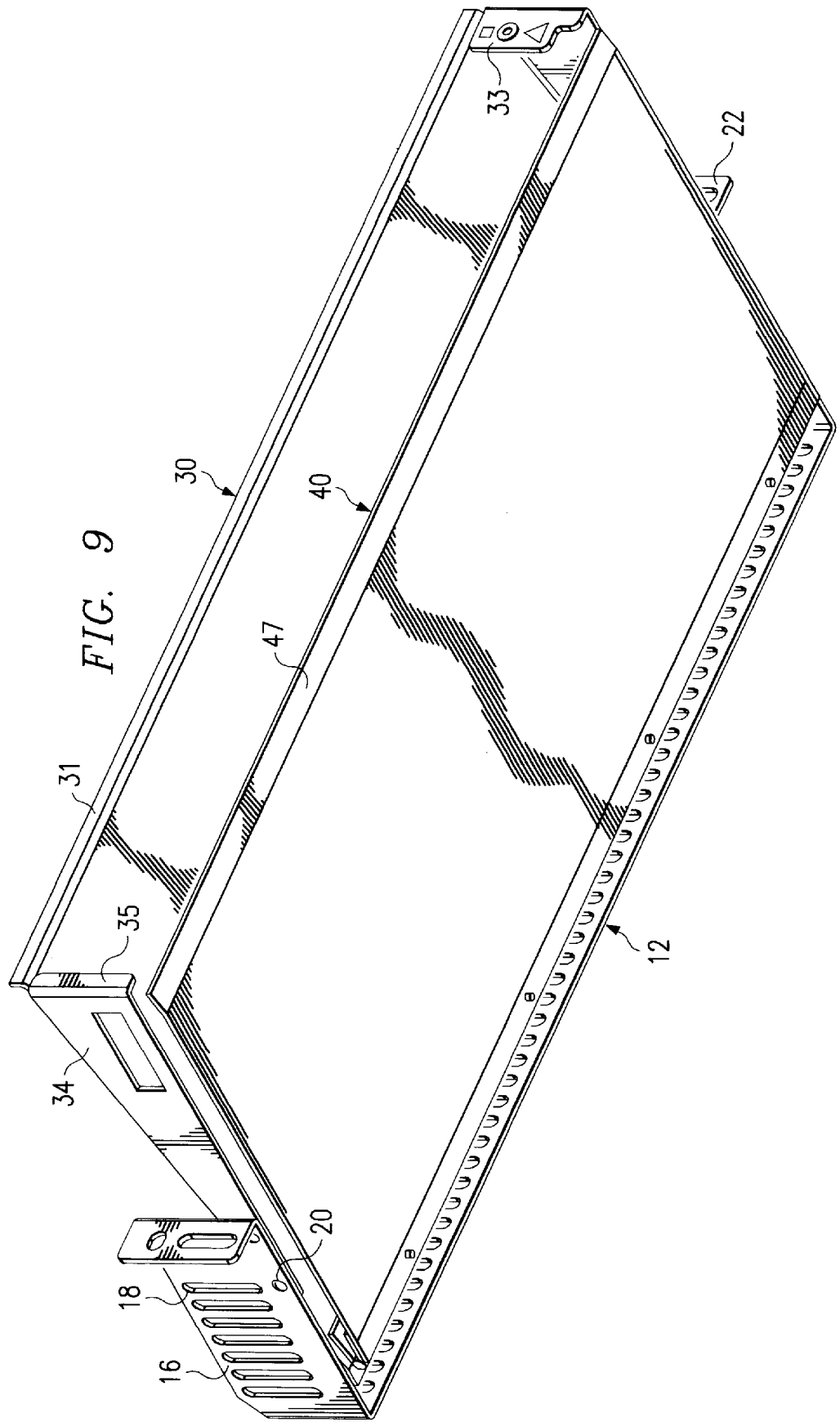
FIG. 9 shows a reverse view of an air ramp apparatus in accordance with a first illustration of the present invention having a tripped damper door.

FIGS. 8 and 9 show the trap door 40 in its second or tripped position after having moved from its first position. In the second position, the trap door 40 is generally parallel to the lower sections of edges 32 and 34. When the trap door 40 is in this position, the upwardly flow of air is substantially blocked from exiting the air ramp 10. Without such an upwardly flow of air, a fire in an enclosure will be extinguished. It is also shown that the trap door 40 is generally the same size of the center section 30 as defined by the edges 32 and 34.

Figure 10:
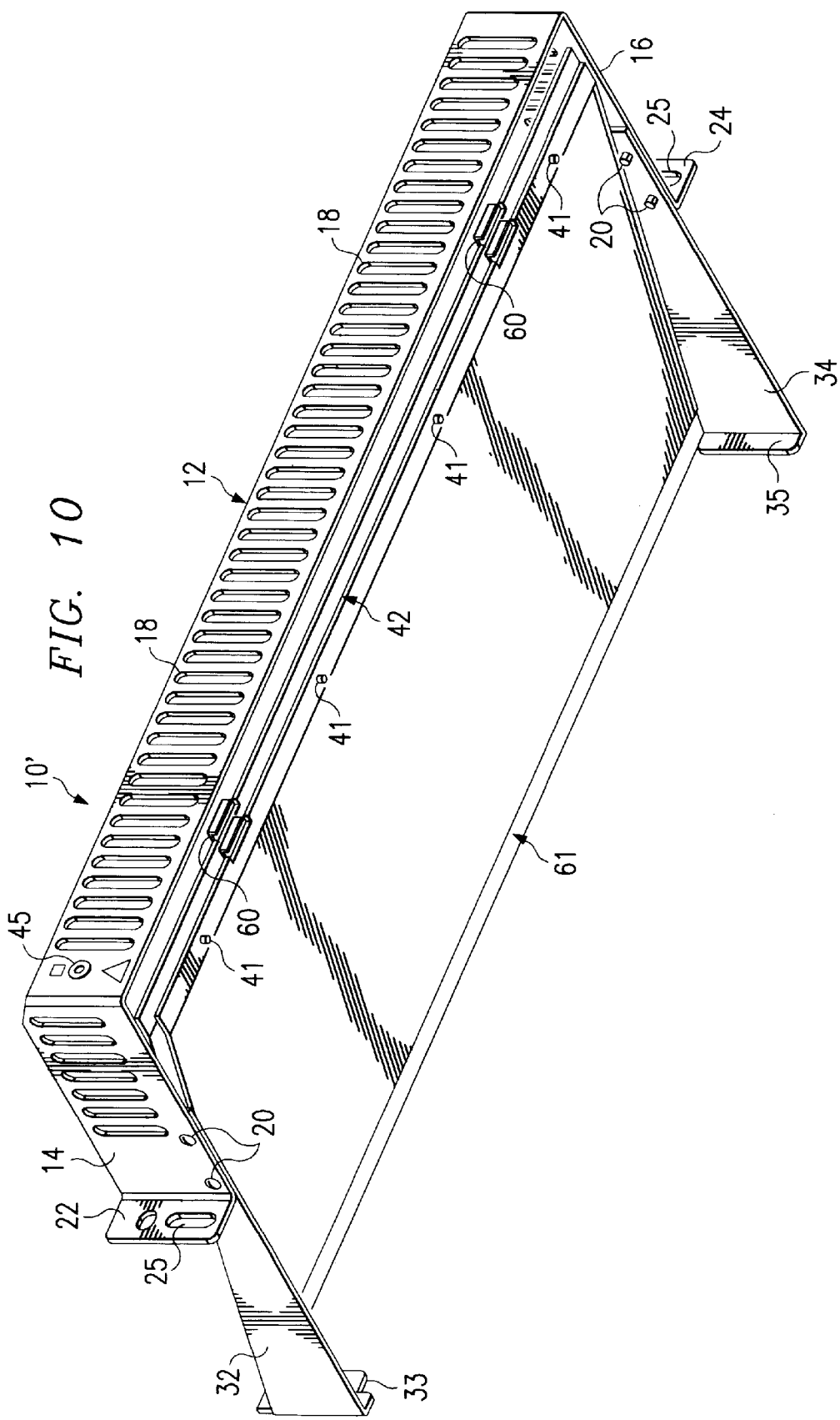
FIG. 10 shows an air ramp apparatus in accordance with a second illustration of the present invention.
Figure 11:
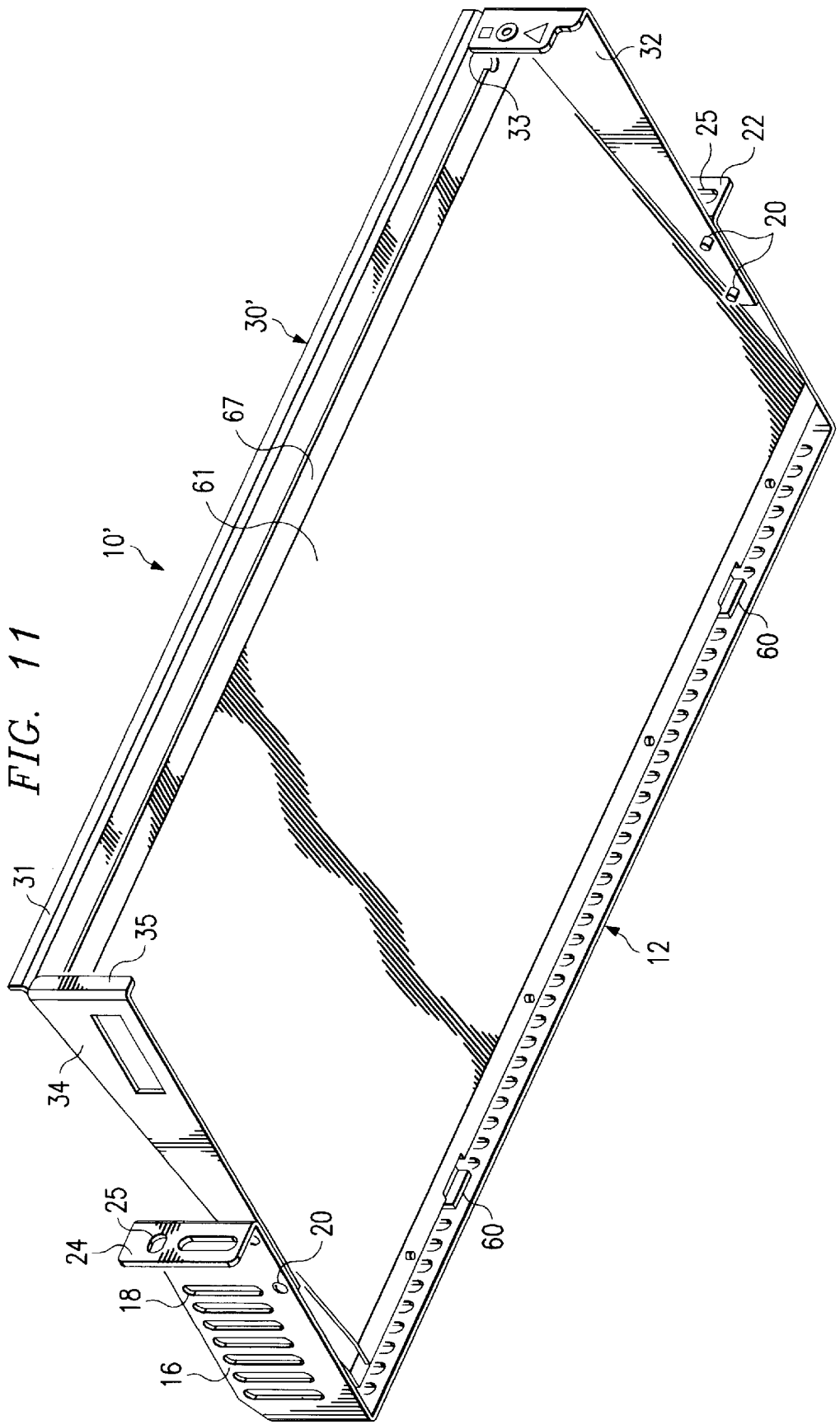
FIG. 11 shows a reverse view of an air ramp apparatus in accordance with a second illustration of the present invention.

FIGS. 10 and 11 show an air ramp 10' as used with a second illustration of the present invention. Since similar elements have already been described and there is no need to mention them again. This second illustration of the air ramp 10' uses a different type of hinge for the trap door. However, the function and action of the air ramp 10' remains the same. A hook type hinge 60 is used for the trap door 61, see FIGS. 19 and 21. The function and movement of the trap door 61 is the same as described above. When a tripping device 50, like that shown in FIG. 18, is tripped, trap door 61 moves from its first position to its second position thereby substantially cutting off the flow of air out of the air ramp 10'. It is also shown that the trap door 41 is generally the same size of the center section 30 as defined by the edges 32 and 34.

Figure 12:
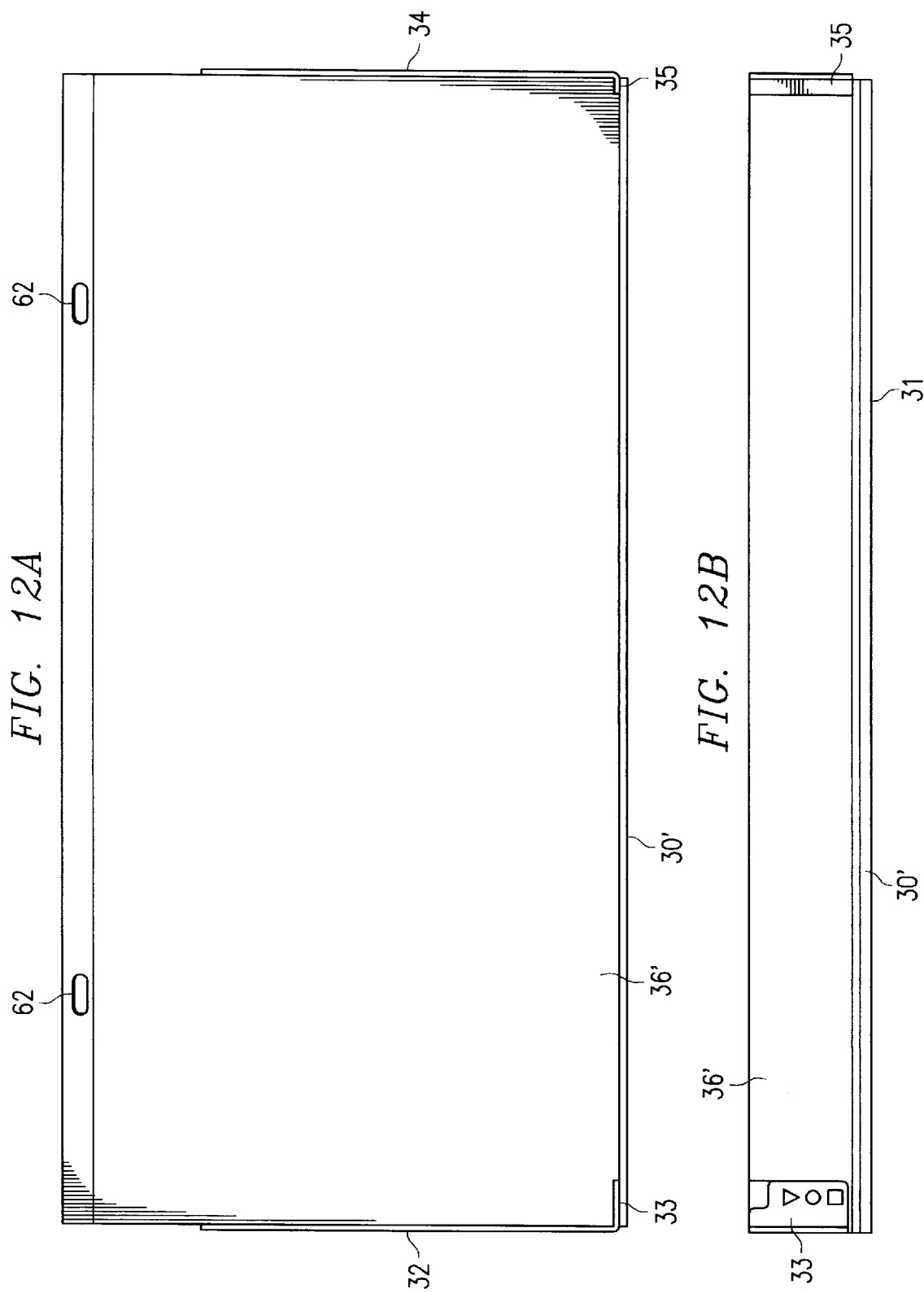
FIGS. 12A–12B show a center section view of an air ramp apparatus in accordance with a second illustration of the present invention.

FIGS. 12A and 12B show a more detailed view of center section 30'. The hook type hinge 60 shown in FIGS. 10 and 11 fits into openings 62 of the center section 30'.

Figure 13:
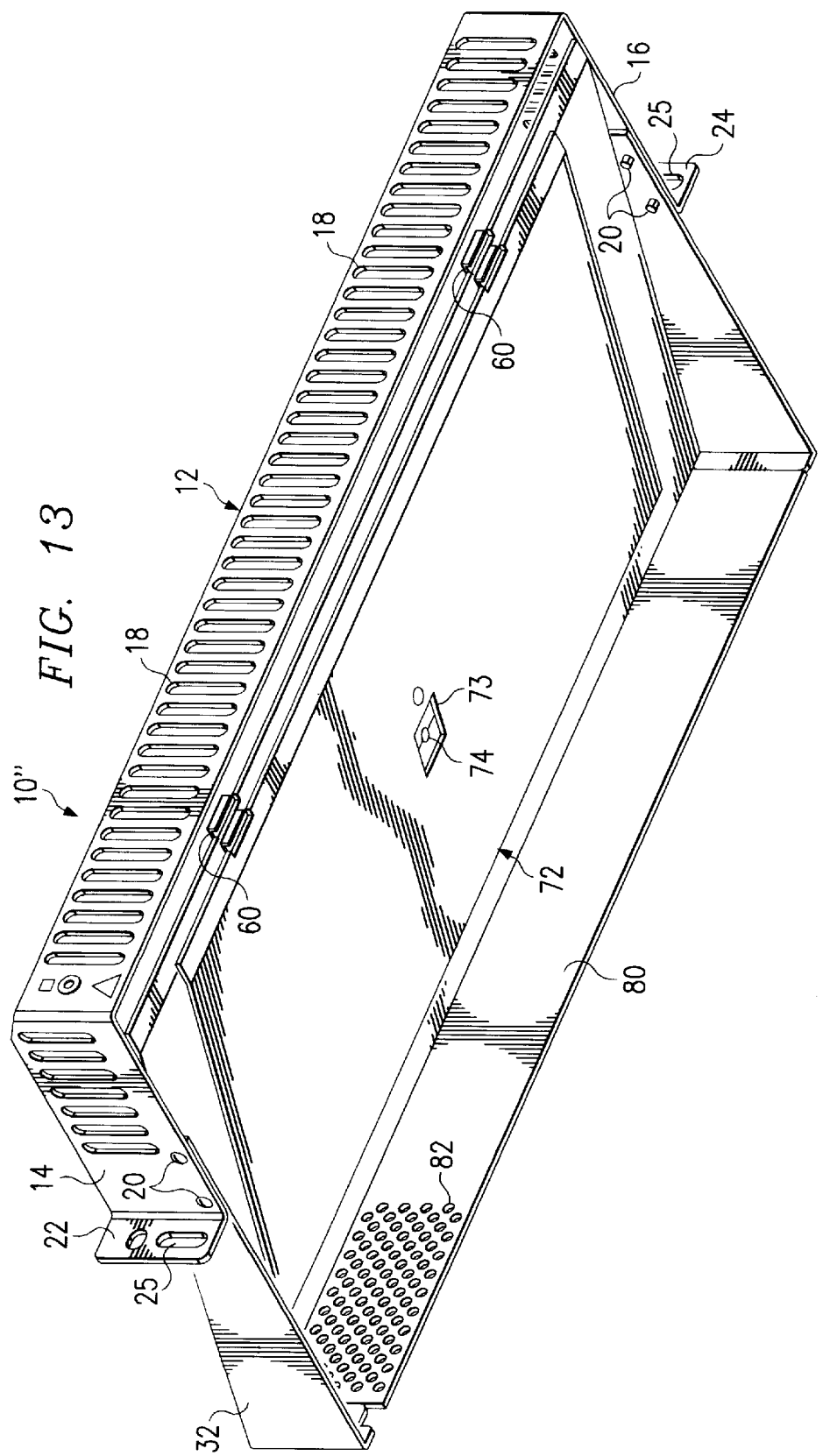
FIG. 13 shows an air ramp apparatus in accordance with a third illustration of the present invention.
Figure 14:
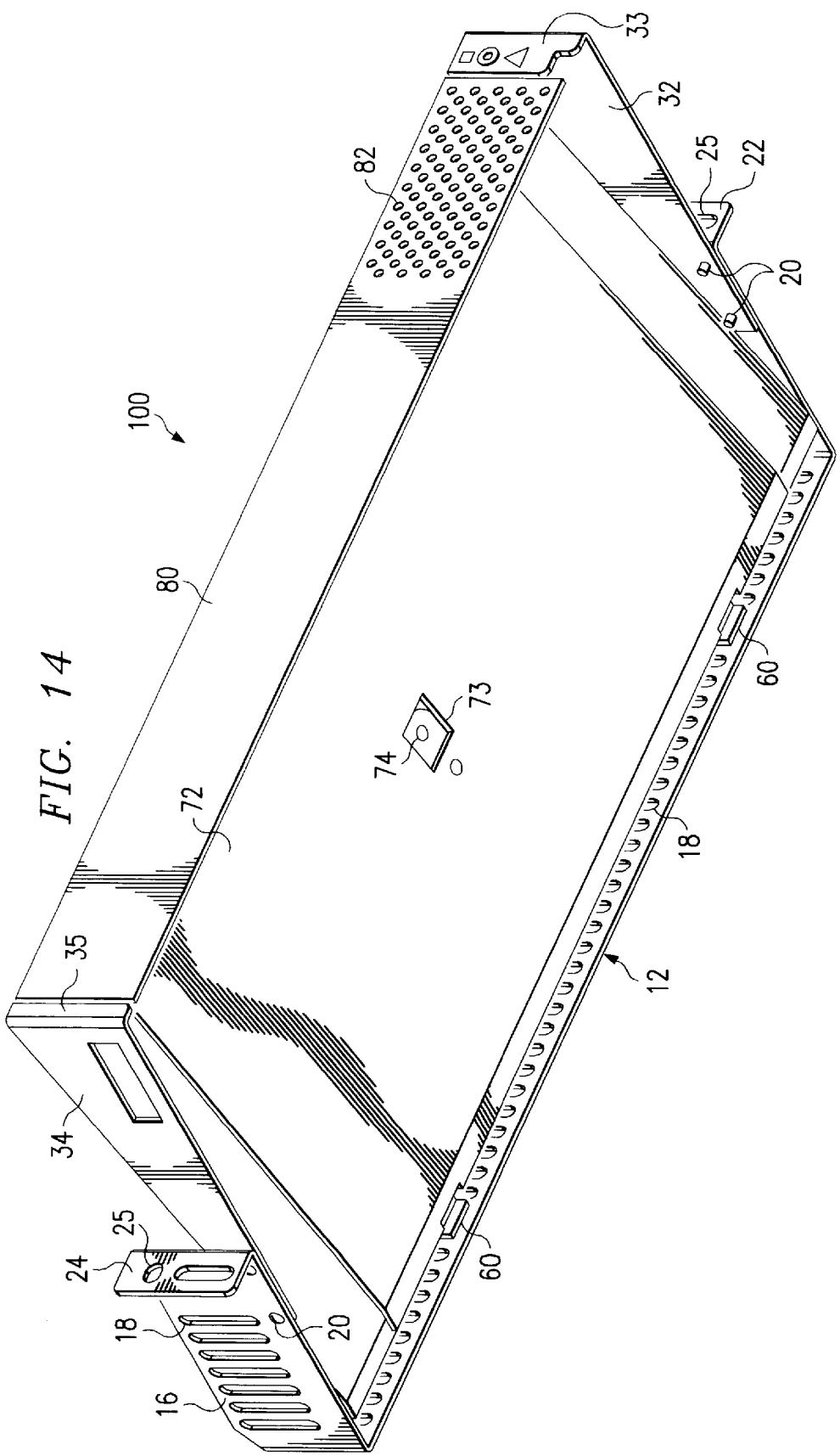
FIG. 14 shows a reverse view of an air ramp apparatus in accordance with a third illustration of the present invention.

FIGS. 13 and 14 show an air ramp 10" as used with a third illustration of the present invention. Since similar elements have already been described, there is no need to mention them again. This third illustration of the air ramp 10" uses a different type of trap door 72, see FIGS. 20 and 21. However the function and action of the air ramp 10" remains the same. The trap door 72 has an opening 73 for allowing the heat from the flow of air to make contact with a tripping device 74. Once the tripping device 74 is tripped by a preselected temperature threshold, the trap door 72 drops from its first position to its second position thereby substantially cutting off the flow of air out of the air ramp 10". Further shown is a back plate 80 having a plurality of holes 82 for allowing the flow of air to exit the air ramp 10". See also FIG. 17. The back plate 80 attaches to edges 32 and 34 at the angled flanges 33 and 35 in a fitted fashion. The back plate 80 controls the amount of air flow exiting the air ramp 10". By doing so, heat from the flow of air penetrates the opening 73. The tripping device 74 used with this embodiment is similar to that shown in FIG. 18. However, there is only one fusible link used and is positioned above the opening 73 and is located between the upwardly ramped center area and the trap door 72. It is also shown that the trap door 72 is generally smaller than the size of the center section 30' as defined by the edges 32 and 34.

Figure 15:
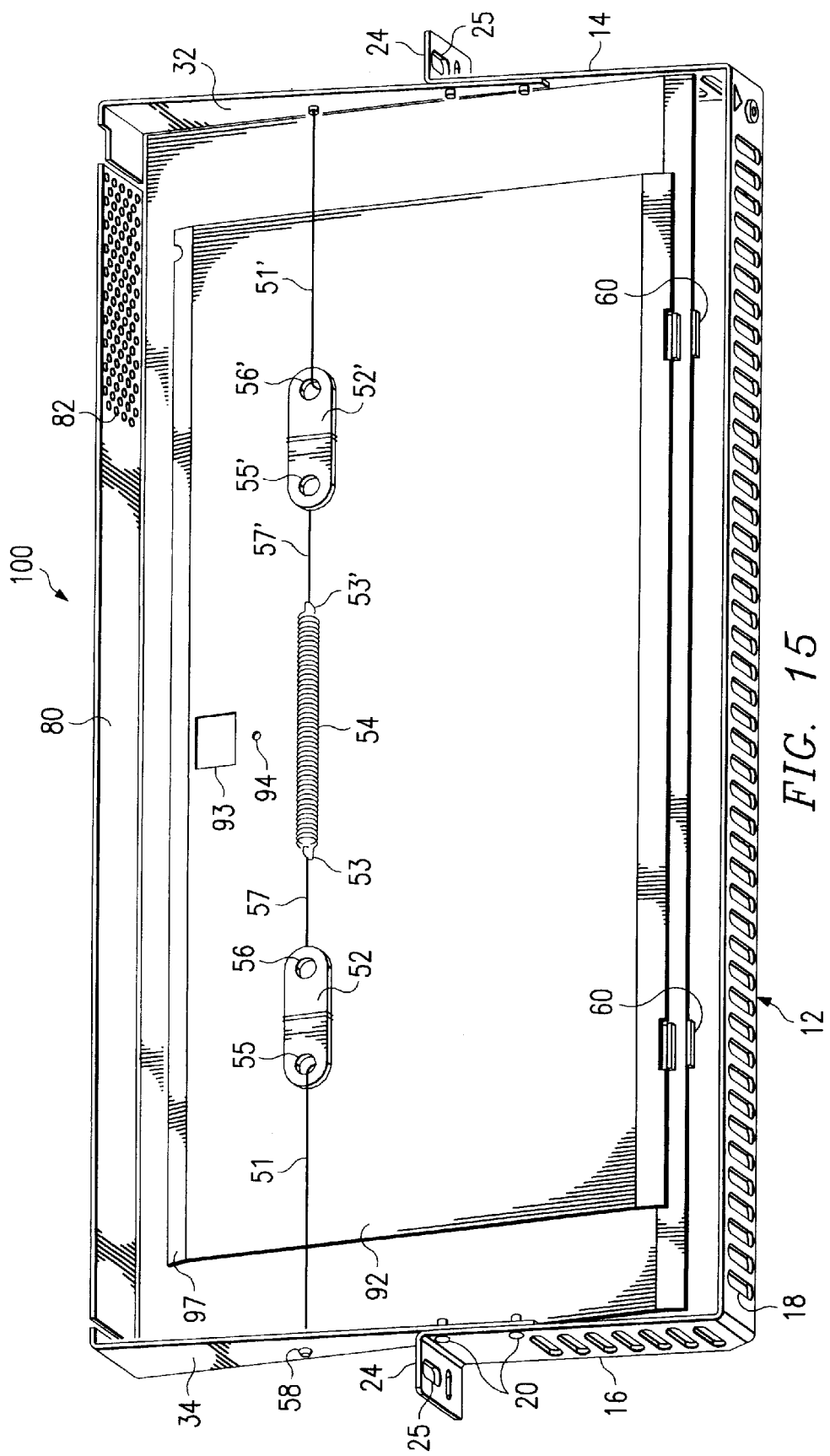
FIG. 15 shows an air ramp apparatus in accordance with a fourth illustration of the present invention.

FIGS. 15 and 16 show an air ramp 100 as used with a fourth illustration of the present invention. Since similar elements have already been described and there is no need to mention them again. This fourth illustration of the air ramp 100 uses a different type of trap door 92, see FIG. 21. However the function and action of the air ramp 100 remain the same. The trap door 92 has an opening 93 and a hole 94 which may be part of a manual tripping and reclosing device. Once the tripping device 50 is tripped by a preselected temperature threshold, the trap door 92 drops from its first position to its second position thereby substantially cutting off the flow of air out of the air ramp 100. It is also shown that the trap door 92 is generally smaller than the size of the center section 30' as defined by the edges 32 and 34.

Figure 19:
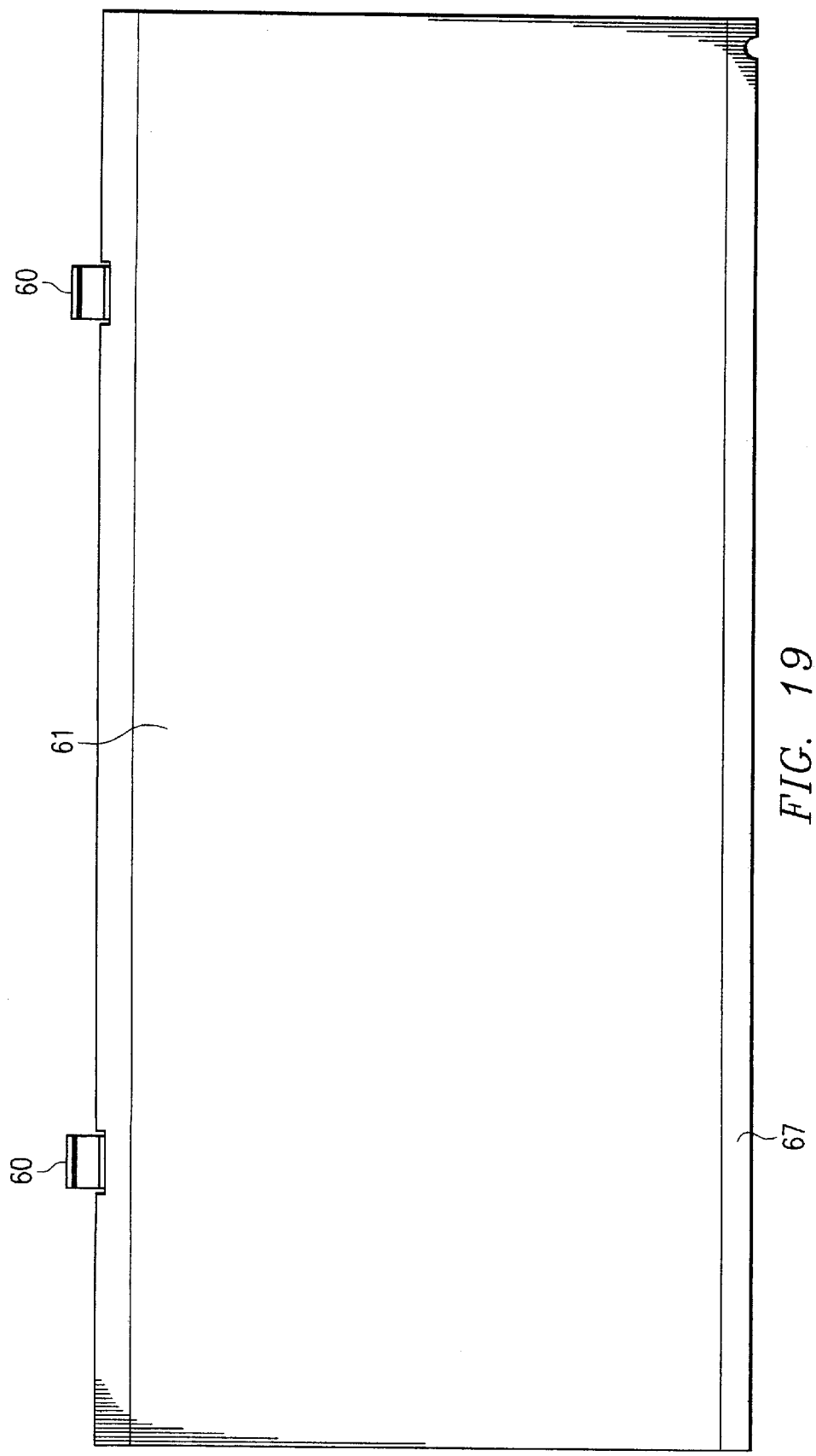
FIG. 19 shows a second illustration of a damper door for an air ramp apparatus in accordance with the present invention.

With reference to FIGS. 19, 20 and 21, each shows different types of trap doors. It is noted that the trap doors 61, 72, and 92 are generally flat except for areas 67, 77 and 97, respectively. The areas 67, 77 and 97 are angled towards the upwardly ramped center area 36'. The trap doors 61,72 and 92 may be made from either metal, heat resistant plastic or tempered glass.

It is to be understood that the provided illustrative examples are by no means exhaustive of the many possible uses for our invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

We claim:

1. An air ramp for an enclosure housing electrical components said air ramp comprising:
    a center section, said center section being adapted so as to direct a flow of air;
    a front section connected to said center section, said front section being adapted so as to allow said center section to be mounted within said enclosure;
    a trap door moveably connected to said center section, said trap door being adapted so as to control a volume of said flow of air.

2. An air ramp as claimed in claim 1 wherein said center section comprises an upwardly ramped center area, said center section further comprises a first edge and a second edge being located at peripheral areas of said upwardly ramped center area.

3. An air ramp as claimed in claim 2 wherein said first and second edges are generally perpendicular to said upwardly ramped center area.

4. An air ramp as claimed in claim 3 wherein said trap door is attached to said upwardly ramped center area at a point on said upwardly ramped center area so as to allow said trap door to pivotally move between a first position and a second position, wherein when said trap door is in said first position it is generally parallel to said upwardly ramped center area and when said trap door is in said second position it is generally parallel to lower areas of said first and second edges.

5. An air ramp as claimed in claim 4 wherein said trap door is held in said first position by a tripping device, wherein when said tripping device has been activated said trap door moves to said second position.

6. An air ramp as claimed in claim 5 wherein said tripping device is temperature activated.

7. An air ramp as claimed in claim 5 wherein said tripping device is attached to said first and second edges to hold said trap door in said first position.

8. An air ramp as claimed in claim 1 wherein said trap door is attached to said center section via an elongated hinge.

9. An air ramp as claimed in claim 8 wherein said elongated hinge is attached to an upwardly ramped center area of said center section and said center section further comprises a first edge and a second edge being located at peripheral areas of said upwardly ramped center area.

10. An air ramp as claimed in claim 1 wherein said front section further includes a plurality of mounting holes.

11. An air ramp as claimed in claim 5 wherein said trap door comprises an angled flange so as to maintain a predefined space between said center section and a main section of said trap door when said trap door is in said first position.

12. An air ramp as claimed in claim 11 wherein said tripping device is located in said predefined space.

13. An air ramp as claimed in claim 9 wherein said first and second edges are generally configured to correspond to said upwardly ramped center area.

14. An air ramp as claimed in claim 12 wherein said tripping device is attached to said trap door.

15. An air ramp as claimed in claim 14 wherein said trap door has an opening and said tripping device is located over said opening so as to be exposed to a temperature of said flow of air.

16. An air ramp as claimed in claim 1 wherein said center section includes a perforated back plate for allowing said flow of air to exit said air ramp.

17. An air ramp as claimed in claim 5 wherein said tripping device is located below said trap door whereby when said tripping device trips said trap door is allowed to fall from said first position to said second position.

18. An air ramp as claimed in claim 5 wherein said tripping device is a heat activated fusible link which separates into two parts when said flow of air reaches a predefined temperature threshold.

19. An air ramp as claimed in claim 5 wherein said tripping device is a heat activated fusible link which separates into two parts when said flow of air reaches a predefined temperature threshold, said fusible link includes openings for allowing a first end of anchor wires to be attached thereto, said anchor wires having a second end being attached to said first and second edges.

20. An air ramp as claimed in claim 1 wherein said trap door includes a plurality of hook type hinges, wherein said hook type hinges are moveably connected to said center section.

21. An air ramp as claimed in claim 5 wherein said tripping device is generally anchored to said first and second edges and includes a temperature activated fusible link.

22. An air ramp as claimed in claim 5 wherein said tripping device includes a series connection of fuseable links and a spring element generally anchored to said first and second edges.

23. An air ramp as claimed in claim 5 wherein said tripping device includes a temperature responsive element, the physical structure of said temperature responsive element changes at a predefined temperature threshold.

* * * * *